(12) United States Patent
Kossner

(10) Patent No.: US 8,231,824 B2
(45) Date of Patent: Jul. 31, 2012

(54) METHOD AND DEVICE FOR PRODUCING A DOUBLE-WALLED THERMOPLASTIC CORRUGATED PIPE HAVING A CONNECTING SLEEVE

(75) Inventor: Hubert Kossner, Schwanfeld (DE)

(73) Assignee: Unicor GmbH (DE)

( * ) Notice: Subject to any disclaimer, the term of this patent is extended or adjusted under 35 U.S.C. 154(b) by 0 days.

(21) Appl. No.: 12/739,211

(22) PCT Filed: Oct. 18, 2008

(86) PCT No.: PCT/EP2008/008848
§ 371 (c)(1),
(2), (4) Date: Sep. 28, 2010

(87) PCT Pub. No.: WO2009/053009
PCT Pub. Date: Apr. 30, 2009

(65) Prior Publication Data
US 2011/0018176 A1    Jan. 27, 2011

(30) Foreign Application Priority Data
Oct. 23, 2007   (DE) .......................... 10 2007 050 923

(51) Int. Cl.
*B29C 49/04* (2006.01)
(52) U.S. Cl. ......... 264/505; 264/508; 264/540; 264/541
(58) Field of Classification Search .................. None
See application file for complete search history.

(56) References Cited

U.S. PATENT DOCUMENTS

| 4,787,598 A | 11/1988 | Rahn et al. |
| 5,296,188 A | 3/1994 | Lupke |
| 5,320,797 A | 6/1994 | Hegler et al. |
| 6,458,311 B1 | 10/2002 | Hegler |
| 7,214,051 B2 | 5/2007 | Lupke et al. |
| 2004/0232579 A1 | 11/2004 | Lupke et al. |

FOREIGN PATENT DOCUMENTS

| DE | 10335518 A1 | 2/2005 |
| EP | 0270694 A1 | 6/1988 |
| EP | 0563575 A2 | 10/1993 |
| JP | 61148036 A | 7/1986 |
| WO | 9501251 A1 | 1/1995 |
| WO | 02070238 A1 | 9/2002 |

OTHER PUBLICATIONS

Office Action from German Application No. 10 2007 050 923.7-16 dated Oct. 21, 2008.
International Search Report PCT/EP2008/008848 dated Jun. 10, 2010.

*Primary Examiner* — Monica A Huson
(74) *Attorney, Agent, or Firm* — Lerner, David, Littenberg, Krumholz & Mentlik, LLP

(57) ABSTRACT

A method and an apparatus for producing an endless double-walled pipe having corrugated pipe sections and sleeve pipe sections are described. The production is effected by extrusion of an outer tube (Sa), forming the outer pipe of the double-walled pipe, and of an inner tube (Si), forming the inner tube of the double-walled pipe, in a molding passage (10) having sections with a corrugated molding surface and a smooth cylindrical sleeve molding surface. To shape the sleeve section, the outer tube is extruded into the sleeve molding surface and is brought into contact with the sleeve molding surface. The inner tube (Si) is then extruded into the outer tube (Sa), already in contact over the entire axial length of the sleeve molding surface, and is brought in the process into contact with the inner side of said outer tube (Sa) that is in contact.

9 Claims, 7 Drawing Sheets

Figure 1:
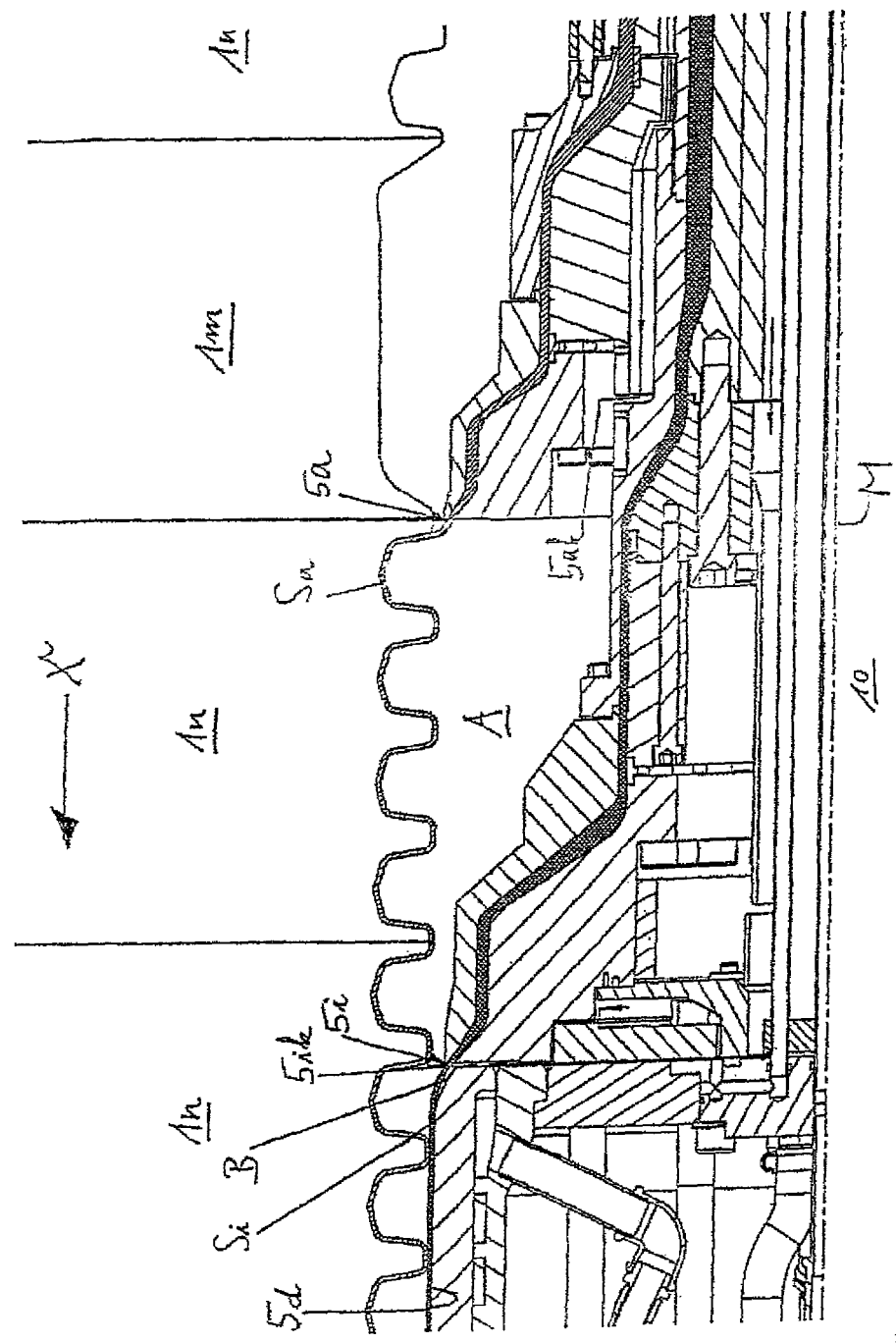

METHOD AND DEVICE FOR PRODUCING A DOUBLE-WALLED THERMOPLASTIC CORRUGATED PIPE HAVING A CONNECTING SLEEVE

CROSS REFERENCE TO RELATED APPLICATIONS

The present application is a national phase entry under 35 U.S.C. §371 of International Application No. PCT/EP2008/008848, filed Oct. 18, 2008, published in German, which claims the benefit of German Patent Application No. 10 2007 050 923.7, filed Oct. 23, 2007. The disclosures of said applications are incorporated by reference herein.

The invention relates to a method and an apparatus for producing an endless double-walled pipe made of preferably thermoplastic material and having corrugated pipe sections and sleeve pipe sections.

Such a method having an associated apparatus is known from EP 0563 575 B1. The corrugated pipe is a composite corrugated pipe consisting of a smooth inner pipe and a corrugated outer pipe which is welded in the region of its corrugation valleys to the inner pipe. The composite pipe has a sleeve section in which the outer pipe has a smooth cylindrical or slightly conical sleeve shape, and the sleeve inner pipe also has a corresponding smooth cylindrical or slightly conical sleeve section which is in contact with the inner side of the sleeve shape of the outer pipe and is welded there. The production of this sleeve pipe takes place continuously by a double-walled endless pipe being produced with successive corrugated pipe sections and sleeve shapes. The endless pipe is cut to length in order thus to produce the sleeve pipe consisting of a corrugated pipe section and a sleeve section.

The endless pipe is produced by virtue of the fact that a double-walled plastic melt tube is extruded via a die head of an extrusion apparatus by an outer tube being extruded from a first nozzle and by an inner tube being extruded concentrically into the outer tube via a downstream second nozzle of the die head. The corrugations and sleeve sections are shaped in a corrugator arranged downstream of the die head, i.e. in the molding passage of said corrugator, said molding passage having successive corrugated and cylindrical or slightly conical molding surfaces due to circulating mold block pairs.

During the shaping of the outer tube and of the inner tube in the molding passage of the corrugator according to the method as described in EP 0 563 575 B1, complex control of the pressures acting on the inner tube and the outer tube is required. The pressures must in each case be matched very accurately to the respective molding operation for the outer and the inner tubes. Since the widening of the outer tube and the widening of the inner tube are initiated at different moments in time but take place simultaneously in an overlapping manner, the matching of the different pressures that are to act on the inner tube and on the outer tube with regard to the time sequence thereof and the magnitude thereof is very complicated.

The same applies to the production method and apparatus described in WO 02/070238 A1 and DE 103 35 518 A1. There, too, the matching of the different pressures acting simultaneously on the inner tube and the outer tube is very complicated.

The object of the invention is to develop a method and an apparatus of the type mentioned at the beginning with the aim of obtaining an especially simple and reliable procedure.

The invention achieves this object with the method according to patent claim 1 and the apparatus according to patent claim 14. It is essential in this case that the method and the apparatus make possible a procedure in which first of all the outer tube is brought into full contact with the cylindrical or slightly conical sleeve shape of the molding surface and only then is the inner tube brought into contact with the inner side of the outer tube already in contact with the cylindrical or slightly conical sleeve shape. Especially simple pressure control thus becomes possible since, during the sleeve shaping, no complicated pressure control for the pressure acting on the inner tube and the outer tube becomes necessary.

The time sequence for the sleeve shaping of the outer tube and of the inner tube can be selected in such a way that no time overlaps occur. This concept can be realized in an especially simple manner in terms of the apparatus if the axial distance between the first nozzle, from which the outer tube is extruded, and the second nozzle, from which the inner tube is extruded, is selected to be larger than the axial linear extent of the sleeve to be formed. A decisive factor for the distance is the distance between the nozzle ends, at which the outer tube and the inner tube, respectively, discharge.

Further features and advantages of possible embodiments are discussed with reference to the figures, which show a preferred exemplary embodiment.

The invention will now be explained in more detail for a preferred exemplary embodiment with reference to figures.

In the drawing, FIGS. 1 to 7 show schematic sectional illustrations of a detail of the molding passage in the starting region of the molding track, with a nozzle device which projects into the molding passage, showing different method stages taking place one after the other.

The corrugator in the exemplary embodiment shown has mold blocks $1n$, $1m$ which are guided progressively in pairs one behind the other in production direction X in a linear molding track 10. With their molding surface, which faces inward, the mold block pairs each surround a substantially cylindrical molding cavity. The mold block pairs guided axially one behind the other in the molding track 10 form a molding passage which is composed of the cylindrical molding cavities and extends along the center axis M depicted in the figures.

A nozzle device 5 of an extruder (not shown) projects into the starting region, shown in the figures, of the molding passage 10. The nozzle device 5 is oriented along the center axis M. The corrugator with its mold blocks $1n$, $1m$ and the nozzle device 5 are each formed symmetrically to the center axis M. Only the right-hand symmetrical side, i.e. only the right-hand mold blocks $1n$, $1m$ and only the right side of the symmetrical nozzle device, is shown in the figures. The correspondingly designed and arranged left-hand mold blocks $1n$, $1m$ and the left-hand side of the nozzle device 5 are therefore not shown in the figures.

Two concentric plastic melt tubes enter the molding passage from the nozzle device 5. The plastic melt tubes are an outer tube Sa and an inner tube Si. These plastic melt tubes pass through the molding passage in production direction X in the molding track 10. In the process, they are formed and cooled on the molding surfaces of the mold blocks $1n$, $1m$ and leave the molding passage as double-walled endless corrugated pipe having sleeve sections.

The mold blocks $1n$, $1m$ are driven in the molding passage via a drive motor (not shown) for the progressive movement in production direction X. The drive motor can be arranged at the bottom in the machine table, on which the mold blocks $1n$, $1m$ are guided, and can mesh, via an output pinion, with racks formed at the bottom on the mold blocks. The mold blocks $1n$, $1m$ are each returned from the end of the molding track 10 to the start of the molding track. This is not shown in the figures. The return can be effected via a motor-driven gripper device, preferably a gripper device for the left-hand mold blocks and a gripper device for the right-hand mold blocks, or also by the left-hand and the right-hand mold blocks being guided in encircling guideways, preferably via motor-driven drivers.

In the case of the mold blocks used in the molding track 10 in the figures, a distinction should be made between normal mold blocks 1n and sleeve mold blocks 1m. The normal mold blocks 1n have a corrugated molding surface for shaping the corrugated pipe sections. The sleeve mold blocks 1m have a preferably smooth cylindrical or slightly conical sleeve molding surface and serve to shape the preferably smooth cylindrical sleeve pipe sections. In each case a plurality of normal mold blocks 1n and only one pair or a few pairs of sleeve mold blocks 1m are guided in the mold block circuit and thus in the molding track 10. In "shuttle corrugators", as known, for example, from EP 0 270 694 B1, the sleeve mold blocks can also be introduced, if desired, in each case only temporarily into the circuit, i.e., after being introduced, they are removed again from the circuit and are parked in a parking station on the machine table.

In the case shown, the nozzle device 5 is designed in such a way that the plastic melt tubes discharging from the nozzle device are formed, as mentioned above, as two plastic melt tubes, namely as an inner tube Si and an outer tube Sa. The nozzle device 5 has an outer nozzle 5a and an inner nozzle 5i. The outer tube Sa discharges at the discharge end of the outer nozzle 5a. The inner tube Si discharges at the discharge end of the inner nozzle 5i. The discharge end of the outer nozzle 5a is arranged upstream of the discharge end of the inner nozzle 5i—as viewed in production direction X. It can therefore be said that the inner tube Si is extruded into the outer tube Sa. A cooling mandrel 5d is arranged downstream at the inner nozzle 5i—as viewed in production direction X.

An air passage 5ak is assigned to the outer nozzle 5a and an air passage 5ik is assigned to the inner nozzle 5i. The discharge end of the air passage 5ak is arranged downstream of the discharge end of the outer nozzle 5a—as viewed in production direction X. Air, "outer air", as assist air for the outer tube Sa, is blown via the air passage 5ak into the space A which is formed between the inner wall of the outer tube Sa and the outer wall of the inner tube Si. In a corresponding manner, air, "inner air", as assist air for the inner tube Si, is blown via the air passage 5ik into the space B between the inner wall of the inner tube Si and the outer wall of the cooling mandrel 5d. The pressure pa of the outer air can be regulated via a pressure regulator connected to the air passage 5ak, e.g. as a function of the respective positions of the mold blocks used in the molding passage and/or according to a predetermined pressure profile. In a corresponding manner, the pressure pi of the inner air can be regulated via a pressure regulator connected to the air passage 5ik.

It is essential in the exemplary embodiment shown that the distance between the discharge end of the outer nozzle 5a and the discharge end of the inner nozzle 5i is greater than the axial extent of the sleeve molding surface L. In the case shown in the figures, the nozzle distance is about 1.4 times as large as the axial extent of the sleeve molding surface L.

In the exemplary embodiment shown, the sleeve molding surface is in each case formed by only one sleeve mold block pair. The molding surface of the sleeve mold block 1m has in each case a smooth cylindrical or slightly conical molding surface having an axial length Lm, as viewed in production direction X, and adjoining this sleeve surface in each case upstream and downstream thereof are transition regions having the axial lengths Lv and Ln. The entire axial length L of the sleeve molding surface is obtained from the sum of Lv, Lh, Lm (see FIG. 3).

The molding surface of the normal mold blocks 1n has in each case a corrugated molding surface, with parallel corrugations arranged axially one behind the other and having periodically recurring corrugation peaks and corrugation valleys, in each case arranged coaxially around the center axis M of the molding passage.

As known per se, the mold blocks 1n, 1m have, in the molding surfaces, vacuum openings which are shown with vacuum passages in the mold blocks via a vacuum device (not shown) in order to help the outer tube to bear against the molding surfaces.

In the sections in which the normal mold blocks 1n act, the endless pipe shaped in the molding track 10 in the case shown is given the shape of a double-walled corrugated pipe having a corrugated outer pipe and a smooth cylindrical inner pipe which is welded to the outer pipe in each case in the region of the corrugation valleys. In the sections in which the sleeve mold blocks 1m act, the endless pipe is given sleeve sections, i.e. a sleeve shape having an axial length L=Lm+Lv+Lh. In the entire region of the length L of the sleeve shape, the outer tube and the inner tube are welded to one another over the full surface area.

The functioning will now be described with reference to FIGS. 1 to 7, which show the different method stages in the molding passage 10 in the region of the nozzle device 5. The different method stages are determined by virtue of which mold block pair, i.e. which molding surface, whether a corrugated molding surface or a sleeve molding surface, is just passing the region of the nozzle device 5 in the starting region of the molding track 10. In the description of the method below, therefore, only the molding surface, i.e. corrugated molding surface or sleeve molding surface, is mentioned and taken into account and thus treated irrespective of whether said molding surface is in each case formed by one or more mold blocks. However, the mold blocks 1n, 1m assigned to the respective molding surfaces are depicted in the figures for the sake of clarity.

FIG. 1:

FIG. 1 shows the stage just before the front edge of the sleeve molding surface runs over the outer nozzle 5a. The entire axial length of the sleeve molding surface is still located upstream of the outer nozzle 5a. As viewed in production direction X, in each case corrugated molding surfaces are arranged upstream and downstream of the sleeve molding surface, and therefore in each case corrugated molding surfaces are arranged in the region between the outer nozzle 5a and the inner nozzle 5i and in the region upstream of the inner nozzle 5i.

The pressure set in the space A by the outer air is at this moment reduced from the pressure pa1 to the pressure pa2. The pressure set in the space B by the inner air is around pi1.

The outer tube Sa discharging from the outer nozzle 5a abuts at this moment against the corrugated molding surface under the effect of the pressure prevailing in the space A. The entire outer tube Sa shown that follows in production direction X in FIG. 1 is already in contact with the corrugated molding surface.

Under the effect of the pressure pi1 set in the space B and/or by means of the cooling mandrel 5d, the inner tube Si discharging from the inner nozzle 5i is forced toward the corrugation valley of the outer tube in contact with the corrugated molding surface in order to be become welded there. The entire inner tube Si continuing in production direction X in FIG. 1 is already in contact, as smooth cylindrical inner tube, with the corrugation valleys of the outer tube Sa and is welded there in each case.

Figure 2:
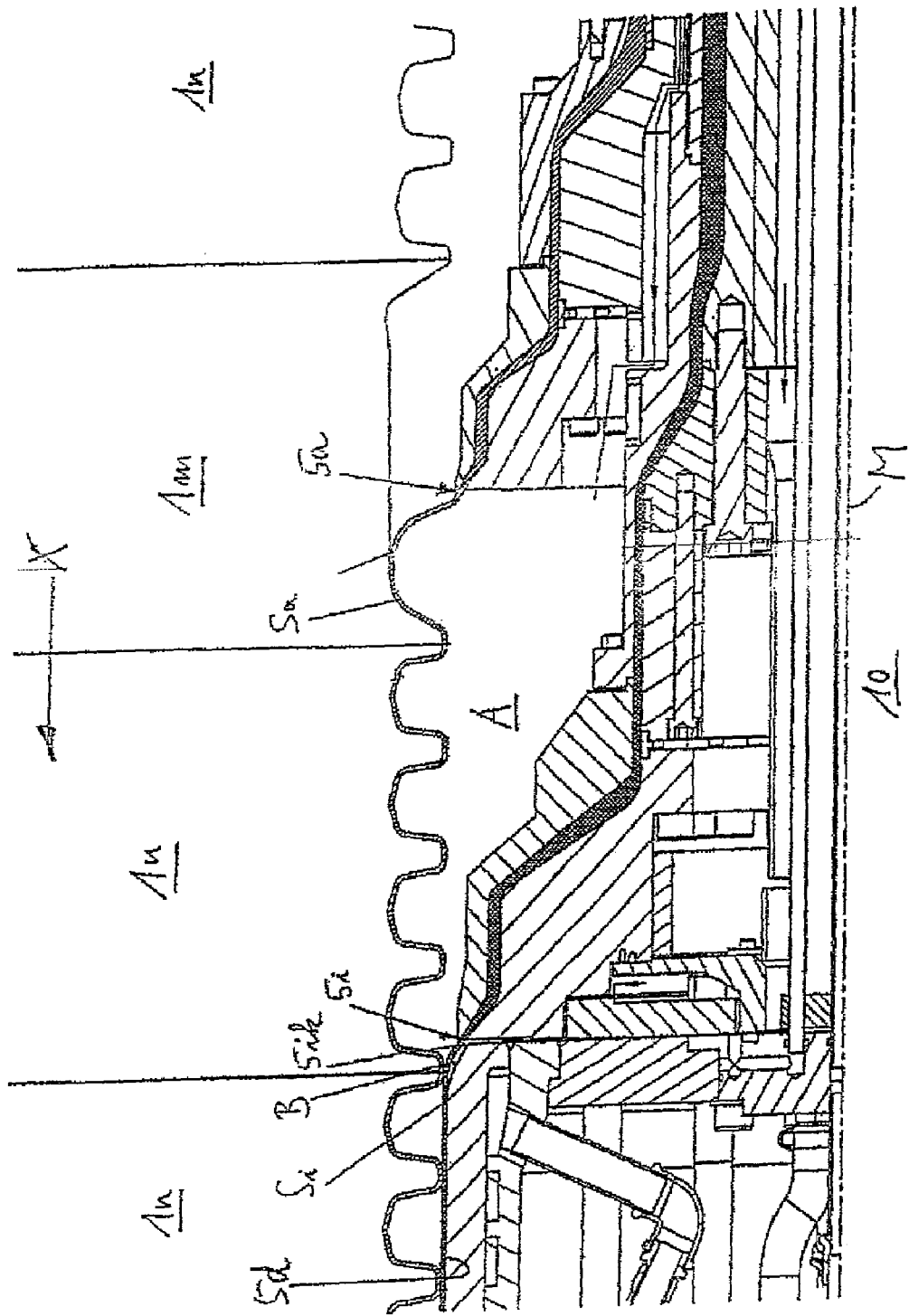

FIG. 2:

FIG. 2 shows the stage when the sleeve molding surface is located precisely over the outer nozzle 5a. A first section of the sleeve molding surface has already passed the outer nozzle 5a. A second section of the sleeve molding surface is still upstream of the outer nozzle 5a.

The pressure in the space A is set as constant pressure pa2 or as pressure pa2 falling with time. The pressure in the space B is constant at pi1.

The outer tube Sa discharging from the outer nozzle 5a abuts at this moment against the sleeve molding surface under the effect of the pressure prevailing in the space A. The further outer tube in production direction X is already in contact with the corrugated molding surface.

Just as in FIG. 1, the inner tube Si, after its discharge from the inner nozzle 5i and under the effect of the pressure pi1 set in the space B and/or by means of the cooling mandrel 5d, is at this moment forced toward the corrugation valley of the outer tube in contact with the corrugated molding surface in order to become welded there.

Figure 3:
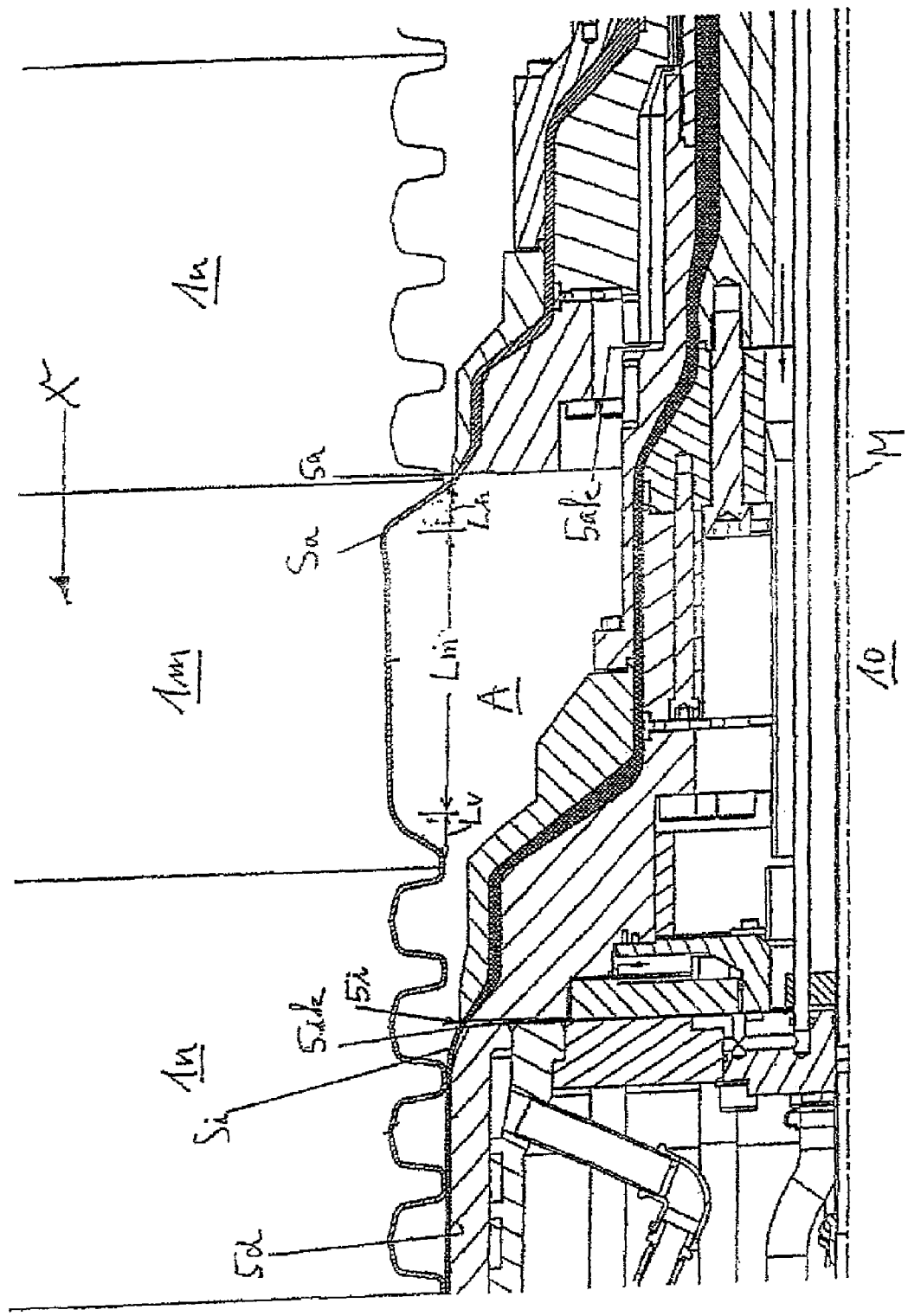

FIG. 3:

FIG. 3 shows the stage when the sleeve molding surface has completely passed the outer nozzle 5a. The outer tube Sa continuing in production direction X in FIG. 1 is already in contact with the surface of the sleeve shape over the entire axial length thereof and is in contact with the corrugated molding surface in its further course in the X direction.

The pressure in the space A is increased again from pa2 to pa1. The pressure in the space B is still constant at pi1.

The outer tube Sa discharging from the outer nozzle abuts at this moment against the sleeve molding surface in the region of the rear end thereof under the effect of the pressure prevailing in the space A.

Just as in FIGS. 1 and 2, the inner tube Si, under the effect of the pressure pi1 set in the space B, is at this moment forced toward the corrugation valley of the outer tube in contact with the corrugated molding surface and is welded there. The inner tube Si continuing in production direction X is already in contact, as a smooth cylindrical inner tube, with the corrugation valleys of the outer tube.

Figure 4:
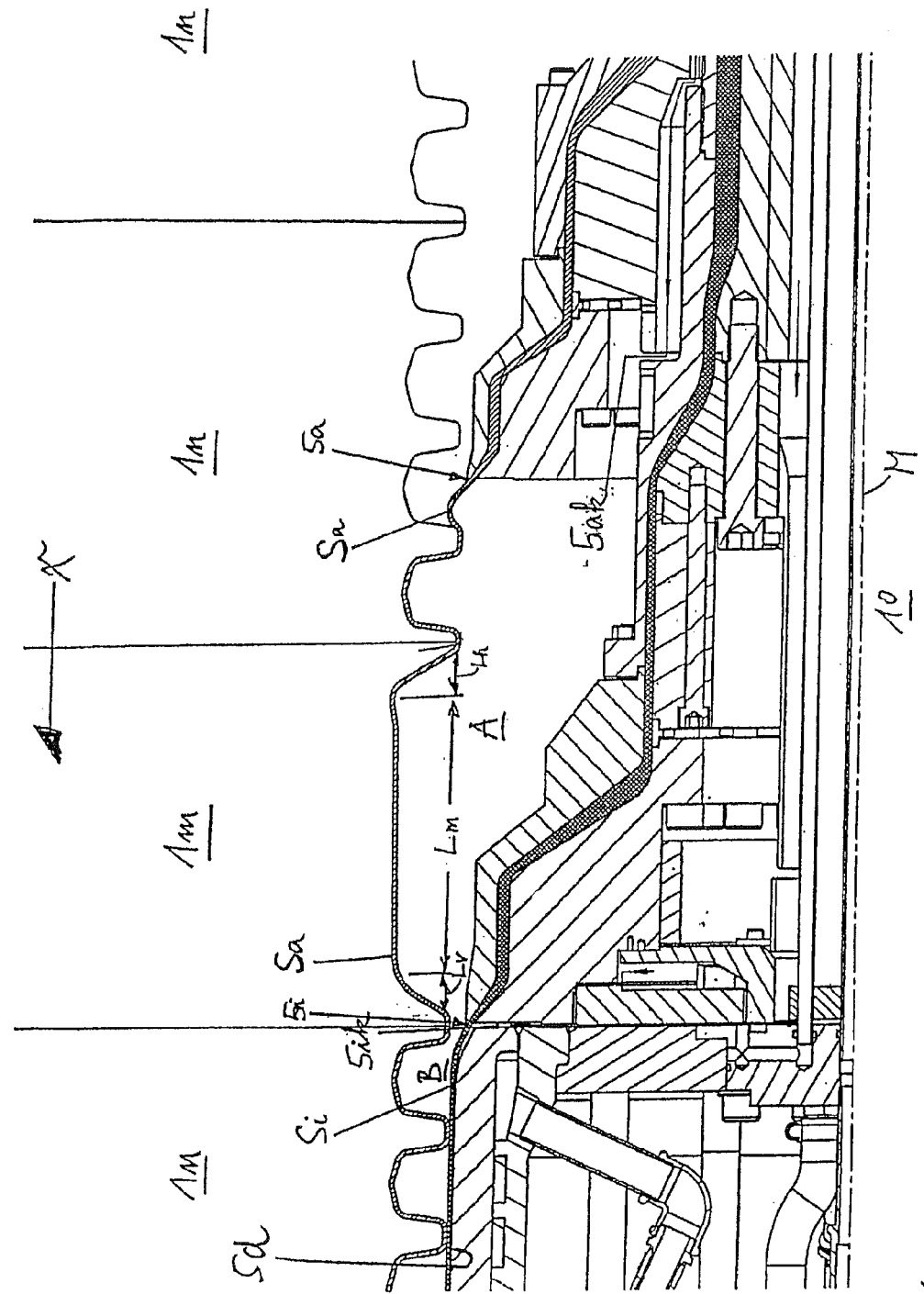

FIG. 4:

FIG. 4 shows the stage when the sleeve molding surface has just reached the position of the inner nozzle 5i.

The pressure pa1 reset in FIG. 3 is set in the space A. The pressure in the space B is increased at this moment from the pressure pi1 to the pressure pi2.

The outer tube Sa discharging from the outer nozzle 5a is brought into contact with the corrugated molding surface over the outer nozzle 5a under the effect of the pressure prevailing in the space A. In the further course of the outer tube Sa in production direction X, said outer tube Sa is already in contact with the sleeve molding surface and with the corrugated molding surface preceding in production direction X.

The inner tube Si discharging from the inner nozzle is at this moment forced under the effect of the pressure prevailing in the space B toward the outer tube Sa in contact with the molding surface, specifically toward the last corrugation valley upstream of the sleeve shape, and is welded.

Figure 5:
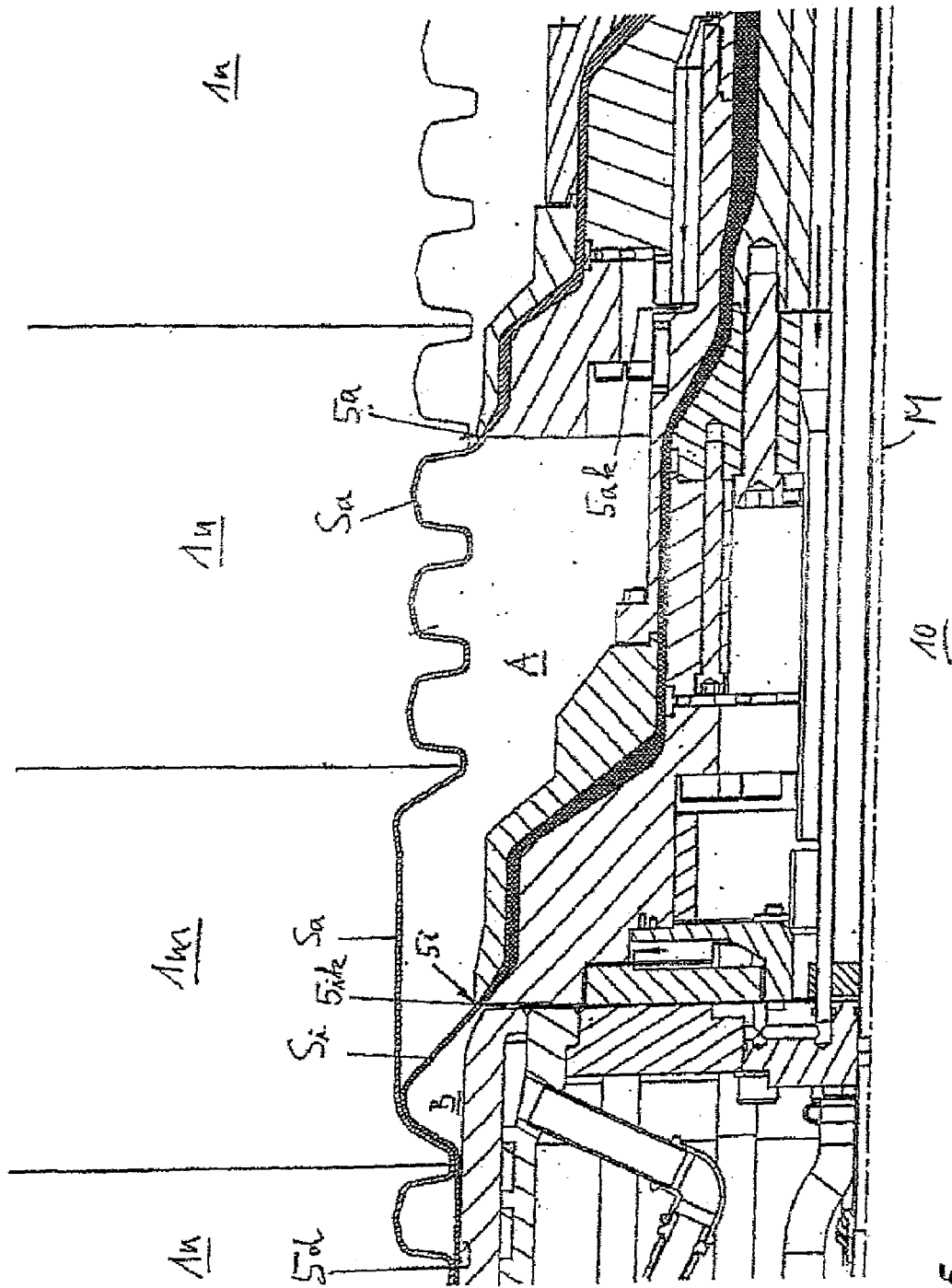

FIG. 5:

FIG. 5 shows the stage when the sleeve molding surface is located precisely over the position of the inner nozzle 5i; specifically, a first section of the sleeve molding surface has already passed the inner nozzle and a second section is still upstream of the position of the inner nozzle 5i.

A constant pressure pa1 is still set in the space A. A pressure pi2 that is still constant or is falling or alternating is set in the space B.

The outer tube Sa discharging from the outer nozzle 5a is at this moment brought into contact with the corrugated molding surface positioned over the outer nozzle 5a. In the further course of the outer tube Si in production direction X, the outer tube Sa is already in contact with the sleeve molding surface and the preceding corrugated molding surfaces.

The inner tube discharging from the inner nozzle 5i is at this moment forced under the effect of the pressure pi2 set in the space B toward the inner side of the outer tube already in contact with the sleeve molding surface and is brought into surface contact.

Figure 6:
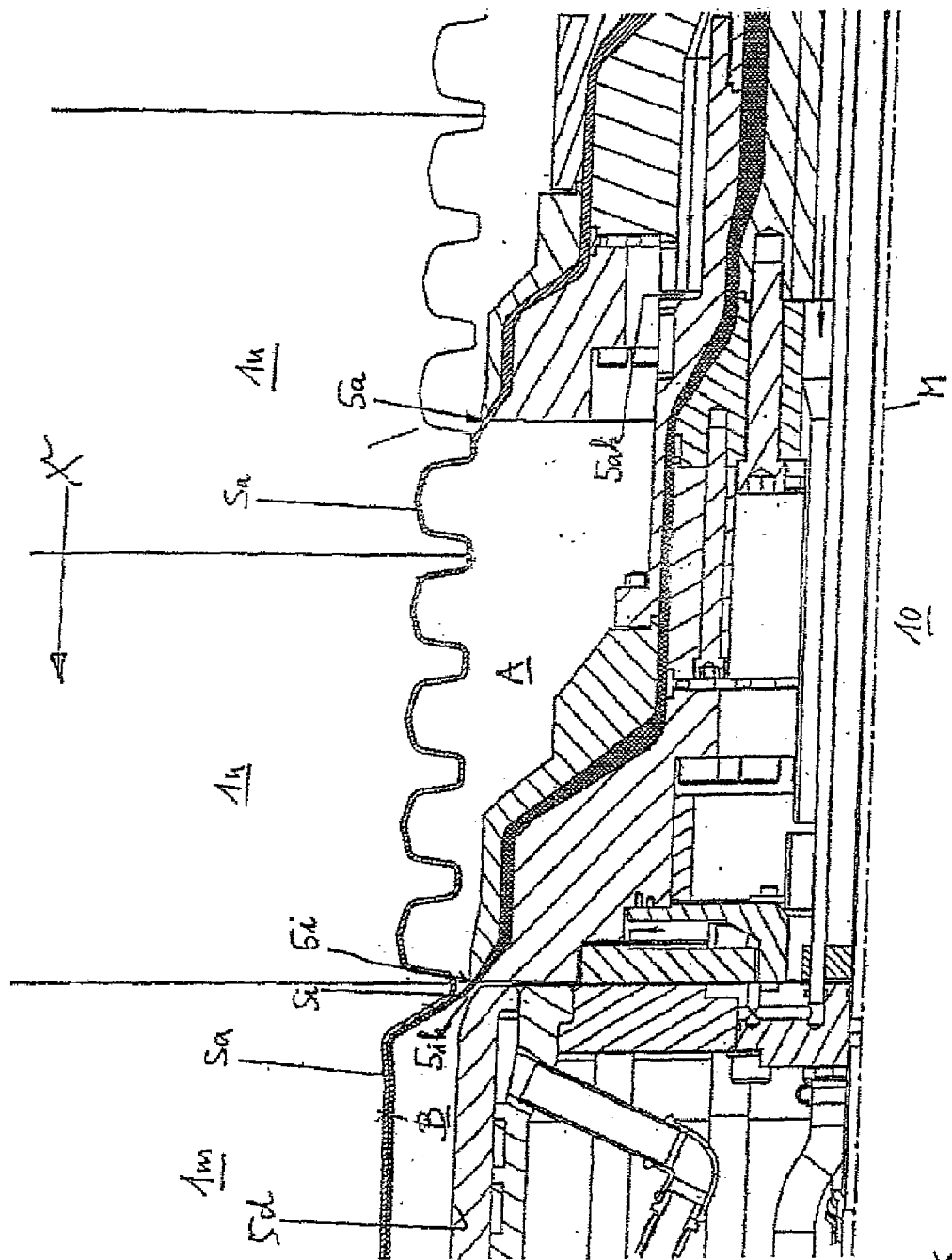

FIG. 6:

FIG. 6 shows the stage when the sleeve molding surface has just passed the position of the inner nozzle 5i.

The pressure in the space B is at this moment reduced to the pressure pi1. In the space A, the pressure pa1 is still set at a constant level.

Under the effect of the pressure prevailing in the space A, the outer tube discharging from the outer nozzle 5a is at this moment brought into contact with the corrugated molding surface arranged over the outer nozzle 5a. In the further course of the outer tube Sa in production direction X, said outer tube Sa is in contact with the corrugated outer surface and with the sleeve molding surface arranged upstream.

Under the effect of the pressure prevailing in the space B, the inner tube. Si discharging from the inner nozzle 5i is brought into surface contact with the outer tube already in contact in the sleeve shape. In its further course in production direction X, the inner tube 5i is already in surface contact with the outer tube Sa in contact in the sleeve molding surface.

Figure 7:
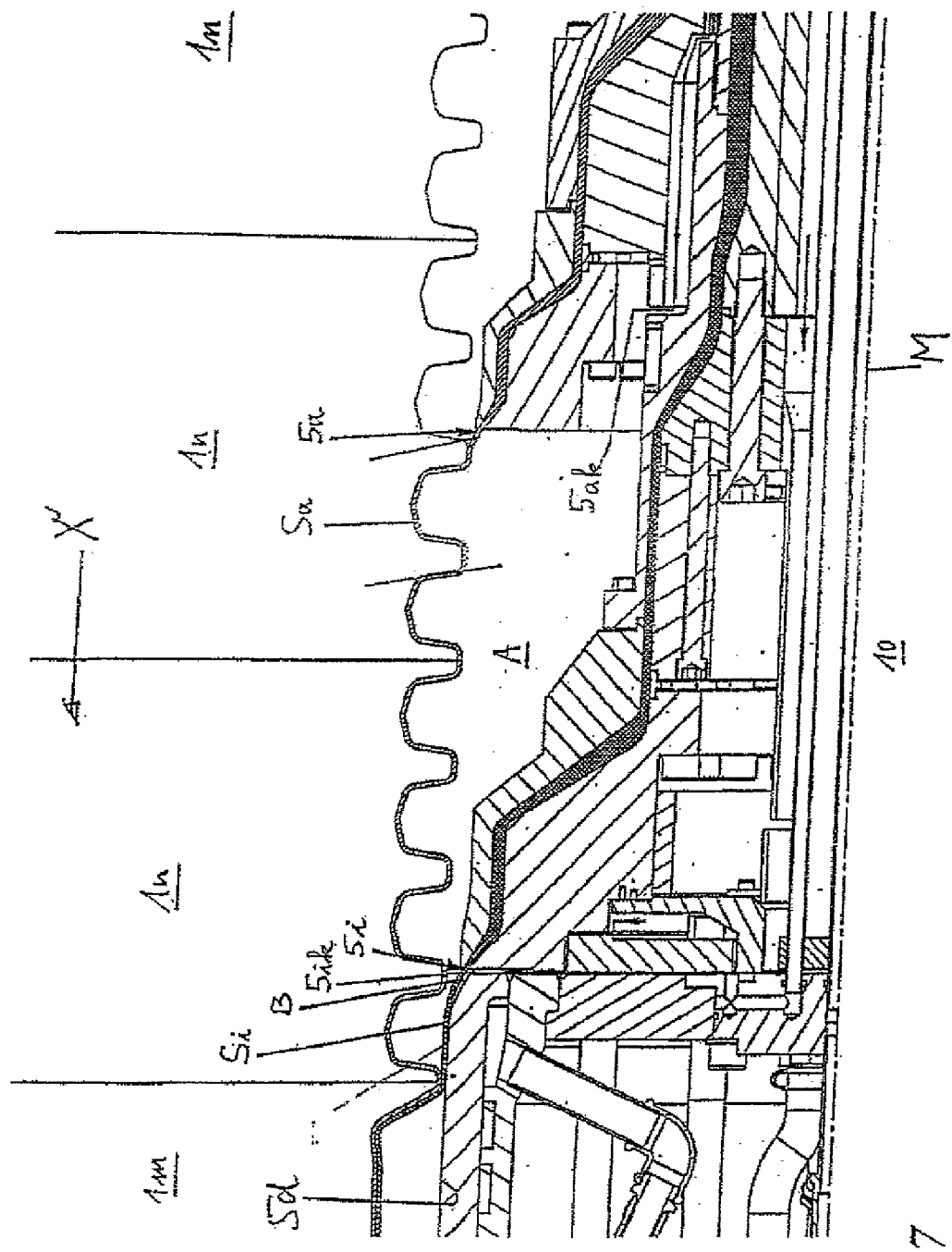

FIG. 7:

FIG. 7 shows the stage when the sleeve molding surface has already completely passed the inner nozzle 5i and a first section of the corrugated molding surface arranged downstream of the sleeve molding surface has passed the inner nozzle 5i, and a corrugated molding surface is also arranged over the entire region between the inner nozzle 5i and the outer nozzle 5a.

In the space B, the pressure is still set at a constant level pi1, and, in the space A, the pressure is still set at a constant level pa1.

The outer tube discharging from the outer nozzle 5a is at this moment brought into contact with the corrugated molding surface under the effect of the pressure pa1. In the further course of the outer tube Sa in production direction X, said outer tube Sa is already in contact with the respective molding surface.

Under the effect of the pressure pi1 set in the space B and/or by means of the cooling mandrel 5d, the inner tube Si discharging from the inner nozzle 5i is forced toward the corrugation valley of the outer tube in contact with the corrugated molding surface and is welded there. The outer tube Sa preceding in production direction X is in contact with the corrugated molding surface, and the inner tube preceding in production direction X is in welded contact, as smooth cylindrical tube, with the corrugation valleys of the outer tube.

These method stages of FIGS. 1 to 7 are in each case repeated cyclically at the start of the molding track on account of the mold blocks guided in the circuit.

An endless double-walled pipe having alternately arranged corrugated pipe sections and sleeve pipe sections discharges at the end of the molding track 10. Corrugated pipes having connecting sleeves are formed by cutting the endless pipe to length.

For example, for the production of a corrugated pipe having a pipe diameter of 100 mm and a typical wall thickness of 0.3 mm, the outer air is operated with pa1 at 0.5 bar and pa2 at 0.45 bar and the inner air is operated with pi1 at 0.5 bar and pi2 at 0.7 bar. Here, the specified pressure values pa1, pa2, pi1 and pi2 are in each case positive pressure values above the ambient pressure, i.e. in each case the magnitude of the pressure difference between the pressure acting on the inner surface of the relevant tube and the prevailing ambient pressure.

LIST OF DESIGNATIONS

1n Normal mold blocks
1m Sleeve mold blocks
5 Nozzle device
5a Outer nozzle
5ak Air passage, outer air
5i Inner nozzle
5ik Air passage, inner air
5d Cooling mandrel
10 Molding track
Sa Outer tube
Si Inner tube
X Production direction
M Center axis
pa1 Pressure of the outer air in the space A
pa2 Pressure of the outer air in the space A
pi1 Pressure of the inner air in the space B
pi2 Pressure of the inner air in the space B
Lm Axial length of the smooth cylindrical sleeve molding surface
Lv Axial length of the front transition region of the sleeve molding surface
Lh Axial length of the rear transition region of the sleeve molding surface

The invention claimed is:

1. A method for producing an endless double-walled pipe made of thermoplastic material and having corrugated pipe sections and sleeve pipe sections, by extrusion of an outer tube, forming the outer pipe of the double-walled pipe, and of an inner tube, forming the inner pipe of the double-walled pipe, in a molding passage having at least one section with a corrugated molding surface and at least one section with a preferably smooth, cylindrical or slightly conical sleeve molding surface, wherein
to shape a corrugated pipe section, the outer tube is extruded into the corrugated molding surface and is brought into contact with the corrugated molding surface, and the inner tube is extruded into the outer tube and is brought into contact with the outer tube, in contact with the corrugated molding surface, in the region of the corrugation valleys of the outer tube;
to shape a sleeve section, the outer tube is extruded into the sleeve molding surface and is brought into contact with the sleeve molding surface, and the inner tube is extruded into the outer tube, already in contact over the entire axial length of the sleeve molding surface, and is brought in the process into contact with the inner side of said outer tube already in contact with the sleeve molding surface over the entire axial length of the sleeve molding surface,
wherein a pressure (pa1) acting on the inner side of the outer tube is reduced to a pressure (pa2) just before or at the same time as the outer tube is extruded into the sleeve molding surface,
wherein the pressure (pa2) acting on the inner side of the outer tube is increased to the pressure (pa1) as soon as the extrusion of the outer tube into the sleeve molding surface is completed,
wherein a pressure (pi1) acting on the inner side of the inner tube is increased to a pressure (pi2) before or at the same time as the inner tube is extruded into the outer tube already in contact with the sleeve molding surface, and
wherein a pressure (pi2) acting on the inner side of the inner tube is reduced to the pressure (pi1) as soon as the extrusion of the inner tube into the outer tube in contact with the sleeve molding surface is completed.

2. The method as claimed in claim 1, wherein the pressure (pa2) acting on the inner side of the outer tube occurs at a constant or falling or alternating level as long as the outer tube is being extruded into the sleeve molding surface.

3. The method as claimed in claim 2, wherein, for the pressure (pa2) acting on the inner side of the outer tube, during the extrusion of the outer tube into the sleeve molding surface, decreasing pressure values are selected for at least one of increasing outer pipe diameters, increasing outer pipe wall thicknesses or increasing inner pipe wall thicknesses.

4. The method as claimed in claim 1, wherein the increase in the pressure acting on the inner side of the outer tube, said increase taking place when the extrusion of the outer tube into the sleeve molding surface is completed, has a magnitude at least approximately the same as the reduction in the pressure (pa1), acting on the inner side of the outer tube, just before or briefly when the outer tube is extruded into the sleeve molding surface.

5. The method as claimed in claim 1, wherein the pressure (pi2) acting on the inner side of the inner tube is set at a constant, falling or alternating level as long as the inner tube is being extruded into the outer tube in contact with the sleeve molding surface.

6. The method as claimed in claim 5, wherein, for the pressure (pi2) acting on the inner side of the inner tube, during the extrusion of the inner tube into the outer tube already in contact with the sleeve molding surface, decreasing pressure values are selected for at least one of increasing outer pipe diameters, increasing outer pipe wall thicknesses or increasing inner pipe wall thicknesses.

7. The method as claimed in claim 1, wherein the reduction in the pressure acting on the inner side of the inner tube, said reduction taking place when the extrusion of the inner tube into the outer tube in contact with the sleeve molding surface is completed, has a magnitude at least approximately the same as the increase in the pressure (pi1), acting on the inner side of the inner tube, before or at the same time as the inner tube is extruded into the outer tube already in contact with the sleeve molding surface.

8. The method as claimed in claim 1, wherein, for the pressure (pa1) acting on the inner side of the outer tube, during the extrusion of the outer tube into the corrugated molding surface, decreasing pressure values are selected for at least one of increasing outer pipe diameters, increasing outer pipe wall thicknesses or increasing inner pipe wall thicknesses.

9. The method as claimed in claim 1, wherein, for the pressure (pi1) acting on the inner side of the inner tube, during the extrusion of the inner tube into the outer tube in contact with the corrugated molding surface, decreasing pressure values are selected for at least one of increasing outer pipe diameters, increasing outer pipe wall thicknesses or increasing inner pipe wall thicknesses.

* * * * *